Sept. 6, 1949.  G. REGET  2,481,242
CAKE ICING MACHINE
Filed Oct. 25, 1948  3 Sheets-Sheet 3
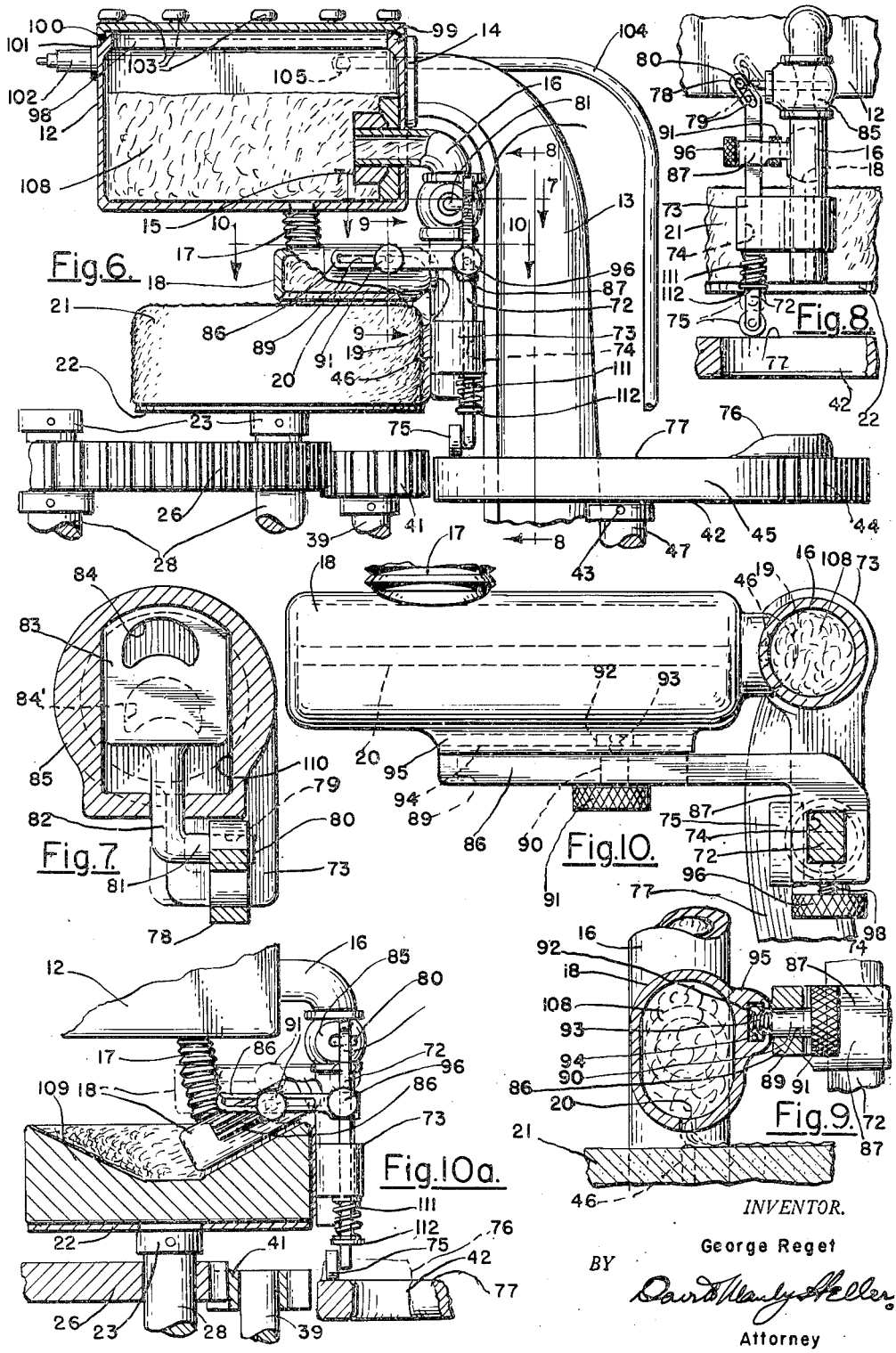
INVENTOR.
George Reget
BY
David Manly Heller
Attorney Patented Sept. 6, 1949

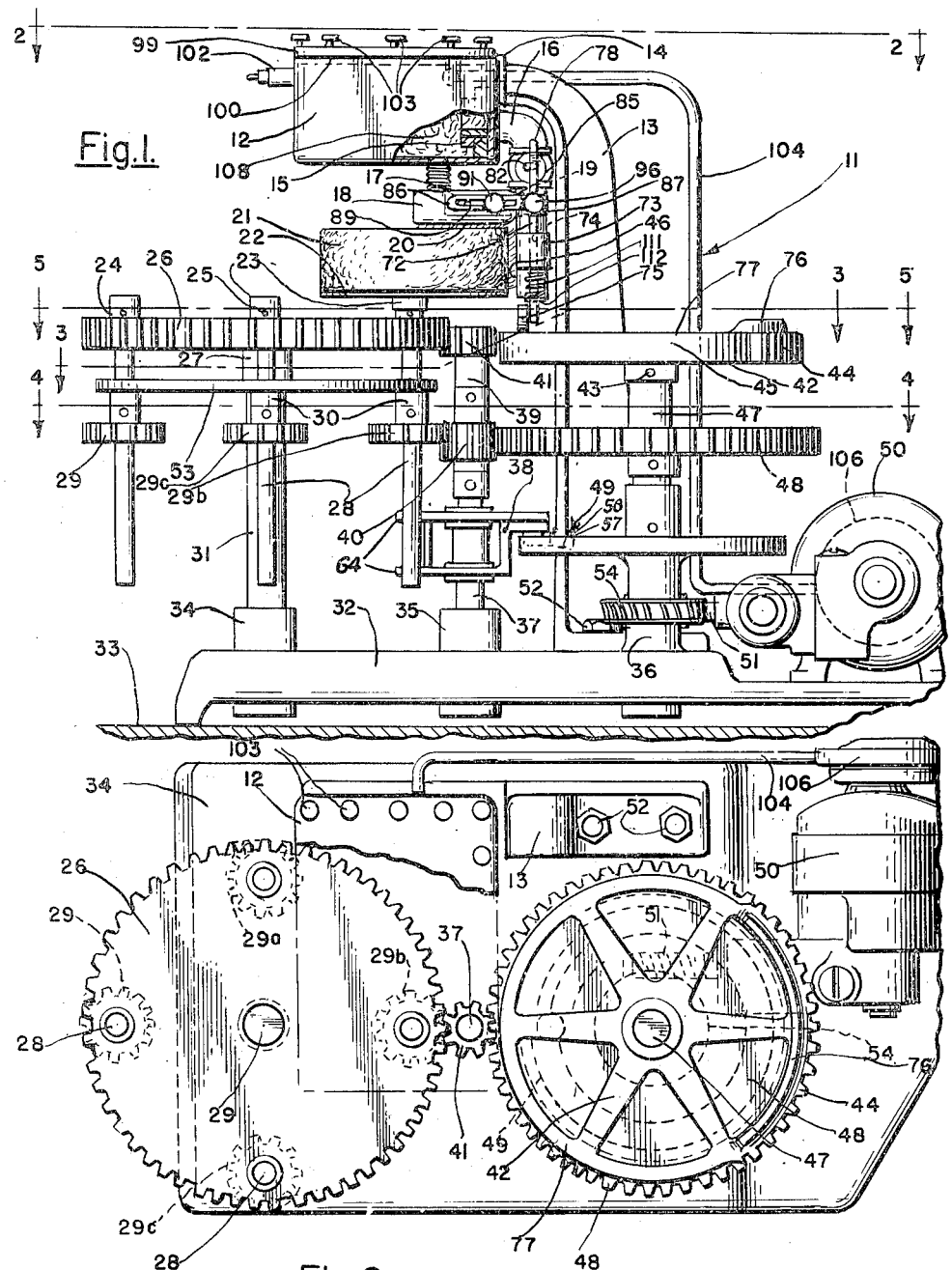

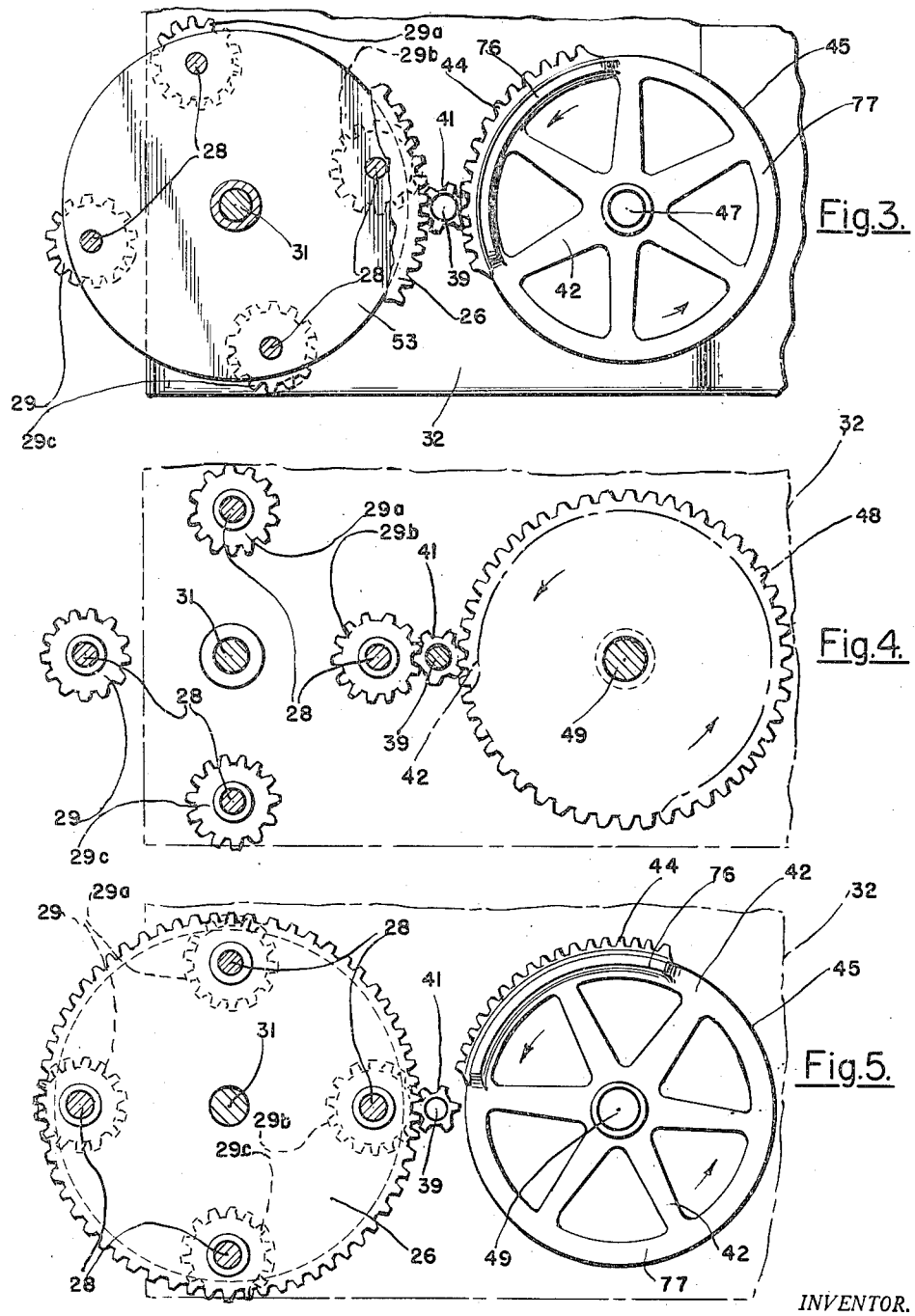

2,481,242

UNITED STATES PATENT OFFICE 2,481,242

CAKE ICING MACHINE

George Reget, St. Albans, N. Y.

Application October 25, 1948, Serial No. 56,460

6 Claims. (Cl. 91—2)

My invention relates to automatic cake icing machines, particularly the type in which cakes of cylindrical configuration, or of frusto-conical configuration, as well as cored cakes, are manually fed into a receiving station on the machine, and manually removed therefrom. This application is a divisional application, namely, a continuation in part of my copending patent application, filed October 31, 1945—Serial #625,709 now Patent No. 2,458,733.

An important object of my invention is to provide an icing fountain which has secured thereto icing distributors or spreaders, the said distributors, or spreader means being adjustable to various angular positions so as to apply icing to the top surface as well as the peripheral surface of a cake passing thereunder, and also for applying icing to the peripheral and top surfaces of cakes having dished out upper surfaces or centrally cored openings therein.

Another object of my invention is to provide icing spreader means, angularly adjustable, associated with feeding fountain means, and automatic intermittently operative pressure feed means for feeding icing through the said spreader means during the period of the cycle when a cake is being rotated one revolution on its support.

An important object of my invention is to provide a machine of the aforementioned character, in which the cake is intermittently fed to the icing spreader station by means of a continuously operative track cam, co-ordinated, or synchronized, with an intermittent cake operative feeding table, the cam providing actuation for an arresting or stop means intermittently motivated so as to time the rotation of the cake to which icing is being applied, and to maintain the cake rotatively under the spreader station, simultaneously rotating the cake thereunder and advancing the cake after the operation has been completed; simultaneously therewith indexing the table mechanism to bring under the spreader station a succeeding cake for applying the icing thereon repeating the operation. The table indicated, although suggestively showing four cake receiving and discharging stations or units, may consist of a feeding table of much larger diameter having many more such cake holding and rotating units.

A further object of my invention is to provide a cake icing machine which is simple in construction, practical and efficient for the purposes for which it may be used, and a machine which may be readily and cheaply assembled, yet of such elemental construction as to warrant economical production thereof in quantity manufacture.

Other features, objects and ancillary advantages to be derived from my invention will become readily apparent from the disclosure embraced in the accompanying drawings, taking into consideration the elucidation in the description hereinafter ensuing, wherein like numerals, or symbols, are used to designate like parts; and, in which, Fig. 1 is a front view of my machine with certain portions thereof in section in order to more clearly elucidate the construction thereof.

Fig. 2 is a plan view thereof with certain portions broken away in order to more clearly indicate the mechanism thereof.

Fig. 3 is a cross-sectional view taken, substantially, on the line 3—3 of Fig. 1, showing the segmental gear in operative position.

Fig. 4 is a cross-sectional view taken, substantially, on the line 4—4 of Fig. 1.

Fig. 5 is a cross-sectional view taken, substantially, on the line 5—5 of Fig. 1 showing the position of the segmental gear having completed the operation of rotating the cake being iced.

Fig. 6 is an enlarged view of the cake icing head of my machine showing the automatic valve and spreader control means.

Fig. 7 is an enlarged fragmentary cross-sectional view of my invention taken, substantially, on the line 7—7 of Fig. 6 and showing the icing valve means thereof with the valve closed.

Fig. 8 is a fragmentary view of my invention, partly in cross section, taken looking in the direction of the lines 8—8 of Fig. 6 and showing the automatic valve and spreader control means thereof.

Fig. 9 is an enlarged fragmentary view of my invention, partly in cross section, taken looking in the direction of the lines 9—9 of Fig. 6 and showing the valve connecting means of my invention.

Fig. 10 is an enlarged fragmentary view, partly in cross section, taken looking in the direction of the lines 10—10 of Fig. 6 and showing the articulate icing spreader and its control means.

Fig. 10a is a fragmentary view, partly in cross section, showing the automatic valve and spreader control means of my invention used in connection with a dished top cake.

Referring to the various views, my invention is, generally, designated 11, and comprises a base 32, having feet resting on the supporting surface 33, and an upright bracket 13 supported thereon and secured thereto by fastenings 52, the said bracket having a head portion 14, which is angular in shape and to which the icing fountain or container 12 is rigidly secured. The said fountain 12 has a bushing structure, or a coupling 15, for securing thereto the elbow shaped piping 16 in which a suitable opening is provided in order to receive articulately the mouth 19 of the spreader tube 18. The said spreader tube being provided with a slotted opening 20 which works in conjunction with the slotted opening 46 in the tubing connection 16. The spreader 18 is connected to the bottom of the icing fountain 12 by means of an accordion-pleated connection 17, so as to permit elongation, or contraction, thereof when the spreader element 18 is adjusted to some such position as to apply the icing to a cake which has a dished out top surface or formation as indicated in Fig. 10a.

The cake 21 may be, preferably, supported on a cardboard disc 22, so as to rest conveniently on the support 23, or the cake may be cored out to fit over the support 23 and the collars 24, which are secured to the upright shaft 28 by means of pins 25. The shaft units 28 are supported in place in proper confinement in a gear 26 which has teeth around its entire periphery, and are also confined by means of the auxiliary disc-like support 53, simultaneously providing suitable spacing and abutment means for the pinions 29, the hubs of which are secured against the abutment disc or plate 53. A spacer collar 27 serves the purpose of maintaining the gear 26 and disc 53 a suitable distance apart. The shafts 28 have the hubs 30 of the pinions 29 firmly secured thereto and rotating therewith so that the shafts 28, the collars 23 and 24 rotate together; the collars 23 and 24 rotate and frictionally engage the cored openings in a cake 21, rotating the same therewith whenever the pinions 29 are motivated.

The gear 26 is mounted on a main shaft 31 which is supported in the hub 34 of the base 32. A second hub 35 supports the shaft 37 on which is mounted the arresting means, and it is spaced off by means of a collar 38 pinned firmly in place, and an auxiliary collar 39 pinned firmly in place, both of which confine rotatively the pinion 40 which meshes successively with the pinions 29, 29a, 29b, and 29c arranged in meshing engagement therewith. The pinion 40 is engaged by the gear 48 which has teeth over its entire peripheral range, and which is mounted on the shaft 47 rotatably secured to the hub 36 of the base. The said shaft has secured thereto a worm wheel 54 (see Fig. 2), the said worm wheel being engaged by a worm 51 secured to the motor 50, thus tending to operate continuously at rather slow speed the shaft 47.

The gear 48 is secured to the shaft 47 and is in meshing engagement with the intermediate pinion 40. At the upper end of the shaft 47 the segmental, or partially toothed, gear 42 is shown in meshing engagement with the intermediate pinion 41 which in turn is in mesh with the full gear 26. The said segmental gear is secured to shaft 47 by pin 43 and has a toothed portion 44, and a blank portion 45, and inasmuch as it is subjected to continual rotation, the pinion 41 will be rotated only for such a period of time while its teeth are in meshing engagement with the teeth 44 of the segmental gear 42. Thus, when that should be the case, the motion imparted through the intermediate pinion 41 to the gear 26 will be sufficient to rotate it 90°, or one-quarter of the cycle, thus tending to bring into meshing engagement a pinion 29 with pinion 40.

At the time that this action is taking place the arresting unit, illustrated in Fig. 1, is also actuated to afford a permanent stop for the shaft 28. This action will be later more clearly elucidated. The arresting means is actuated by a track cam, generally designated 49 and is the basis of my Patent 2,458,733 issued January 11, 1949.

In Figures 6 to 10a the structure of my automatic valve and spreader control means is brought out in detail and consists of an upright cam follower shaft 72 slidably positioned and held in place by a cam shaft guide bracket 73 which is attached to the elbow shaped piping 16 of icing head 12. The slot 74 in cam shaft guide bracket 73 affords the said upright cam follower shaft 72 a vertical motion which is controlled by a cam roller 75 attached to the lower end of the said upright cam follower shaft 72 and which rides upon the top surface of a segmental or partially toothed gear 42. The said top surface of gear 42 is divided into a raised cam segment 76 and a dwell portion 77. An angular slot extension 78 is formed on the upper end of upright cam follower shaft 72 and is provided with a cam slot 79, in which is positioned a cam roller 80 attached to the bent end portion 81 of a valve stem 82. The said valve stem 82 is integral with the gate 83 of a gate valve 85. The said gate 83 has a valve slot 84 aligned with a valve opening 84 in gate valve 83, as shown in Fig. 7. A spreader motivating arm 86 is slidably attached to upright cam follower shaft 72 by slot 88 in spreader arm head portion 87. A retainer screw 90 is adjustably secured in the elongated slotted portion 89 in spreader motivating arm 86. The said retainer screw 90 is provided with a knurled manipulating portion 91 and has a reduced threaded end portion 92 which, together with a square engaging nut 93 movable in a slide way 94, provides a variable connection with the boss portion 95 of spreader tube 18 to afford angular adjustment to spreader tube 18. The spreader arm head portion 87 is tapped at 98 for the threaded portion 97 of a knurled head set screw 96 which, when tightened, provides a rigid connection between spreader motivating arm 86 and upright cam follower shaft 72.

The icing fountain or container 12 is provided with a safety valve 102 and an icing fountain cover 99 which is clamped thereon by clamping means 103 against annular flange 101 and shoulder 102 and is sealed hermetically by a rubber gasket 100. One end of an air pipe 104 is connected to the icing fountain 12 by a union 105. The other end of said air pipe 104 connects to an air pump 106 which is motivated by prime mover 50. A compression coil spring 111 is positioned between a collar 112 near the lower end of upright cam follower shaft 72 and cam shaft guide bracket 73 to maintain cam roller 75 in constant contact with either the dwell portion 77 or the raised cam segment 76 of the segmental or partially toothed gear 42 which is connected by pin 43 rotating shaft 47. A flat top cake 21 or a dished top cake 109 is preferably mounted on a cardboard disc 22 on support 23 and collar 24 attached to one of the upright shafts 28 which is journalled near the outer circumference of large gear 26.

The cake icing 108 which is contained within icing fountain 12 is forced through elbow shaped piping 16 and through mouth 19 thereof into spreader 18 and thence through the said slotted portions 20 and 46 by air pressure. In the operation of the automatic valve and spreader control means, the cam roller 75 on the end of upright cam follower shaft 72 rides upon either the dwell portion 77 or the raised cam segment 76 of segmental toothed gear 42 as shown. It will be seen, referring to the illustrations, that the raised cam segment 76 is of the same magnitude and coincident with the toothed portion 44 of gear 42, and that the dwell portion 77 is of the same magnitude and coincident with blank portion 45 of the said gear 42. During the dwell of gear 42 no rotational motivation is provided through pinion 41 to gear 26 so that the cake 21 or 109 is maintained in an icing position as shown in Fig. 6. Also, during the dwell period of gear 42 the cam roller 75 together with upright cam follower shaft 72 is maintained in its lowered position held by spring 111 to hold gate valve 85 in open position to allow the cake icing 108 to flow or be forced through elbow shaped piping 16, mouth 19, and into spreader 18, then through slots 20 and 46 onto the rotating cake 21 or 109. As the gear 42 rotates, bringing toothed segment 44 into contact with pinion 41, the large gear 26 is rotated 90°, turning the iced cake 21 or 109 away from the cake icing means and bringing an uniced cake into alignment therewith. Simultaneously, by means of raised cam segment 76 through cam roller 75 and upright cam follower shaft 72, the gate valve 85 is caused to be closed by cam slot 79 and cam roller 80, shutting off the supply of cake icing 108 during the 90° rotation of the said large gear 26.

Fig. 6 illustrates a flat top cake designated 21 being iced, during which operation the set screw 96 in spreader arm head portion 87 is loosened to allow free vertical movement of upright cam follower shaft 72 without moving the spreader motivating arm 86.

Fig. 10a illustrates a dished top cake designated 109 positioned on cardboard disc 22 in the icing operation. In this case the set screw 96 in spreader arm head 87 is tightened to provide a rigid connection between the said spreader motivating arm 86 and upright cam follower shaft 72. Since the retainer screw 90 pivots freely within elongated slotted portion 89, therefore as the cam roller 75 rides on dwell portion 77, the spreader 18 will be maintained at an angular position conforming to the angle of the dished top cake 109 so that the icing 108 will be spread evenly through slot 20 onto the surface of the said cake 109. The accordion-pleated connection 17 adjusts itself, as may be seen from Fig. 10a, to either the lower position shown in solid lines or the raised position shown in dotted lines, to accommodate the angular motion of the spreader tube 18.

The operation of the machine is as follows: The cakes 21 that are to be fed into the machine are placed on the proper extreme mounting unit on the shaft 28, at the left of Fig. 1, the machine is started, and cakes are caused to travel until they reach the position directly below the applicator or icing spreader slots 20 and 46. The worm gear rotates the shaft 47 continually which tends to rotate the cam 49 and the segmental gear 42 continually. The gear 26 is rotated intermittently only at such times when the teeth 44 of the segmental gear 42 engage the intermediate pinion 41 and transmit motion to the gear 26. The number of teeth on the segmental gear 42 occupy that portion of the gear to effectuate a 90° ratio or period of rotation of the gear 26. While that is taking place the cam is, preferably, operating on the trackage 56 whereby the arresting means is extended in the position shown in Fig. 1, and engages the unit shaft 28 preventing further movement of the gear 26, and at this particular moment the segmental gear has completed its operation, as indicated at Fig. 4. The full gear 48 being always in engagement with the pinion 40 rotates the pinion 29a for a period of time sufficient to revolve the cake 21 more than a complete revolution so as to make certain that the icing has been spread over its entire peripheral surface as well as its entire top surface. When this operation has been completed then the dwell 57 approaches the roller as indicated in Fig. 2, continuing the movement, when the result of Fig. 9 occurs, whereby the arresting means is retracted, permitting the shaft 31 to rotate in a counterclockwise direction to bring the succeeding shaft 28 and pinion 29b into alignment; the arresting means is fully described in my Patent Number 2,458,733.

The dwell being active for but a short period of time, instantly releases or advances the arresting means to be timely receptive to function against the free end of the succeeding shaft 28 and arrest it by virtue of portions 64 thereof. The quadrant of a cycle having been completed, the remaining quadrants are similarly operated or actuated completing the entire cycle of operation. Iced cakes are removed and replaced with others requiring icing by an operator under whose control the machine functions.

As the toothed segment 44 of the revolving gear 42 comes into contact with pinion 41 to cause a cake-changing rotational movement of 90° to gear 26, the raised cam segment 76 will cause the icing spreader 18 to be articulately raised to a horizontal position as shown by dotted line in Fig. 10a, clearing the cake 109 to allow its movement. As an uniced cake 109 is presented in alignment to cake spreader 18, the rotation of gear 26 ceases as hereinabove described. Simultaneously, roller 75 passes from raised cam segment 76 to the lowered dwell portion 77, and through upright cam follower shaft 72 and spreader motivating arm 86, causes the angular lowering of articulate spreader tube 18 to the surface of the dished cake 109. The angle of the said spreader 18 is adjustable with the angle of the dished surface of the cake 109 by means of retainer screw 90 which may be moved to the right or to the left in elongated slotted portion 89 and in the slide way 94 to set the spreader tube 18 at the desired angle.

Although I have herein described, rather succinctly, the construction and operation of my invention, and since it is susceptible of modification and improvement, I reserve the right to any and all modifications and improvements coming within the scope and spirit of my invention, also such modifications as are impliedly suggested or embraced in the accompanying drawings, as well as those improvements falling within the purview of the foregoing description.

Having thus described and revealed my invention, what I claim as novel and desire to secure by Letters Patent, is:

1. A machine of the character described comprising, a base, a motivating shaft mounted rotatably on said base, a cam mounted on said motivating shaft, a driving gear mounted on said motivating shaft, a segmental gear mounted on said motivating shaft, an intermediate shaft mounted on said base, an intermediate pinion mounted on said intermediate shaft in meshing engagement with the said driving gear, a second intermediate pinion mounted on the said intermediate shaft in meshing engagement with the said segmental gear, arresting means slidably engaging the said intermediate shaft and provided with a roller in engagement with the said cam and further provided with arresting extensions, a driven shaft mounted on the said base, a cake supporting table mounted on said driven shaft and provided with peripheral gear teeth in meshing engagement with the said second-mentioned intermediate pinion, a multiplicity of cake supporting units rotatably mounted in the said cake supporting table, each of the said cake supporting units provided with a driven pinion alternately engageable in meshing relationship with the said first-mentioned intermediate pinion, each of the said cake supporting units having their mounting shafts extended so as to be arrested alternately and releasably by the said arresting extensions, cake icing fountain means supported on said base above the said cake supporting table, valve means connected to the said cake icing fountain means, icing spreader means made up of two branches in angular relationship connected to the said fountain means through the said valve means and arranged to spread icing on the top and peripheral surfaces of a cake supported on one of the said cake supporting units, prime mover means connected to the said motivating shaft, automatic valve control and spreader control means connected to the said icing spreader means and the said valve means and provided with cam follower means, segmental cam means encompassing the toothed portion of the said segmental gear for actuating the said follower means, pump means connected to the said prime mover means, and piping means interconnecting the said cake icing fountain means to the said pump means.

2. A machine of the character described comprising, a base, a motivating shaft mounted rotatably on said base, a cam mounted on said motivating shaft, a driving gear mounted on said motivating shaft, a segmental gear mounted on said motivating shaft, an intermediate shaft mounted on said base, an intermediate pinion mounted on said intermediate shaft in meshing engagement with the said driving gear, a second intermediate pinion mounted on the said intermediate shaft in meshing engagement with the said segmental gear, arresting means slidably engaging the said intermediate shaft and provided with a roller in engagement with the said cam and further provided with arresting extensions, a driven shaft mounted on the said base, a cake supporting table mounted on said driven shaft and provided with peripheral gear teeth in meshing engagement with the said second-mentioned intermediate pinion, a multiplicity of cake supporting units rotatably mounted in the said cake supporting table, each of the said cake supporting units provided with a driven pinion alternately engageable in meshing relationship with the said first-mentioned intermediate pinion, each of the said cake supporting units having their mounting shafts extended so as to be arrested alternately and releasably by the said arresting extensions, cake icing fountain means supported on said base above the said cake supporting table, valve means connected to the said cake icing fountain means, automatically adjustable icing spreader means made up of two branches in angular relationship connected to the said fountain means through the said valve means and arranged to spread icing on the top and peripheral surfaces of a cake of dished formation supported on one of the said cake supporting units, prime mover means connected to the said motivating shaft, automatic valve control and spreader control means connected to the said icing spreader means and the said valve means and provided with cam follower means, segmental cam means encompassing the toothed portion of the said segmental gear for actuating the said follower means, pump means connected to the said prime mover means, and piping means interconnecting the said cake icing fountain means to the said pump means.

3. A machine of the character described comprising, a base, a motivating shaft mounted rotatably on said base, a cam mounted on said motivating shaft, a driving gear mounted on said motivating shaft, a segmental gear mounted on said motivating shaft, an intermediate shaft mounted on said base, an intermediate pinion mounted on said intermediate shaft in meshing engagement with the said driving gear, a second intermediate pinion mounted on the said intermediate shaft in meshing engagement with the said segmental gear, arresting means slidably engaging the said intermediate shaft and provided with a roller in engagement with the said cam and further provided with arresting extensions, a driven shaft mounted on the said base, a cake supporting table mounted on said driven shaft and provided with peripheral gear teeth in meshing engagement with the said second-mentioned intermediate pinion, a multiplicity of cake supporting units rotatably mounted in the said cake supporting table, each of the said cake supporting units provided with a driven pinion alternately engageable in meshing relationship with the said first-mentioned intermediate pinion, each of the said cake supporting units having their mounting shafts extended so as to be arrested alternately and releasably by the said arresting extensions, cake icing fountain means supported on said base above the said cake supporting table, valve means connected to the said cake icing fountain means, angularly adjustable icing spreader means made up of two branches in angular relationship connected to the said fountain means through the said valve means and arranged to spread icing on the top and peripheral surfaces of a cake supported on one of the said cake supporting units, prime mover means connected to the said motivating shaft, automatic valve control and spreader control means connected to the said icing spreader means and the said valve means and provided with cam follower means, segmental cam means encompassing the toothed portion of the said segmental gear for actuating the said follower means, pump means connected to the said prime mover means, and piping means interconnecting the said cake icing fountain means to the said pump means.

4. A machine of the character described comprising, a base, a motivating shaft mounted rotatably on said base, a cam mounted on said motivating shaft, a driving gear mounted on said motivating shaft, a segmental gear mounted on said motivating shaft, an intermediate shaft mounted on said base, an intermediate pinion mounted on said intermediate shaft in meshing engagement with the said driving gear, a second intermediate pinion mounted on the said intermediate shaft in meshing engagement with the said segmental gear, arresting means slidably engaging the said intermediate shaft and provided with a roller in engagement with the said cam and further provided with arresting extensions, a driven shaft mounted on the said base, a cake supporting table mounted on said driven shaft and provided with peripheral gear teeth in meshing engagement with the said second-mentioned intermediate pinion, a multiplicity of cake supporting units rotatably mounted in the said cake supporting table, each of the said cake supporting units provided with a driven pinion alternately engageable in meshing relationship with the said first-mentioned intermediate pinion, each of the said cake supporting units having their mounting shafts extended so as to be arrested alternately and releasably by the said arresting extensions, cake icing fountain means supported on said base above the said cake supporting table, valve means connected to the said cake icing fountain means, icing spreader means connected to the said fountain means through the said valve means and arranged to spread icing on the top and peripheral surfaces of a cake supported on one of the said cake supporting units, prime mover means connected to the said motivating shaft, the said spreader means including, a depending elbow secured to the said icing fountain means, and a horizontal spreader articulately secured to the said depending elbow and connected at its free end by extensible piping to the bottom of the said icing fountain means, the said depending elbow and the said horizontal spreader provided with slotted icing feeder and spreader portions substantially throughout their lengths beginning at the point of their articulate connection, automatic valve control and spreader control means connected to the said icing spreader means and the said valve means and provided with cam follower means, segmental cam means encompassing the toothed portion of the said segmental gear for actuating the said follower means, pump means connected to the said prime mover means, and piping means interconnecting the said cake icing fountain means to the said pump means.

5. A machine of the character described comprising, a base, a motivating shaft mounted rotatably on said base, a cam mounted on said motivating shaft, a driving gear mounted on said motivating shaft, a segmental gear mounted on said motivating shaft, an intermediate shaft mounted on said base, an intermediate pinion mounted on said intermediate shaft in meshing engagement with the said driving gear, a second intermediate pinion mounted on the said intermediate shaft in meshing engagement with the said segmental gear, arresting means slidably engaging the said intermediate shaft and provided with a roller in engagement with the said cam and further provided with arresting extensions, a driven shaft mounted on the said base, a cake supporting table mounted on said driven shaft and provided with peripheral gear teeth in meshing engagement with the said second-mentioned intermediate pinion, a multiplicity of cake supporting units rotatably mounted in the said cake supporting table, each of the said cake supporting units provided with a driven pinion alternately engageable in meshing relationship with the said first-mentioned intermediate pinion, each of the said cake supporting units having their mounting shafts extended so as to be arrested alternately and releasably by the said arresting extensions, cake icing fountain means supported on said base above the said cake supporting table, valve means connected to the said cake icing fountain means, automatically adjustable icing spreader means connected to the said fountain means through the said valve means and arranged to spread icing on the top and peripheral surfaces of a cake of dished formation supported on one of the said cake supporting units, prime mover means connected to the said motivating shaft, the said spreader means including, a depending elbow secured to the said icing fountain means, and a horizontal spreader articulately secured to said depending elbow and connected at its free end by extensible piping to the bottom of the said icing fountain means, the said depending elbow and the said horizontal spreader provided with slotted icing feeder and spreader portions substantially throughout their lengths beginning at the point of their articulate connection, automatic valve control and spreader control means connected to the said icing spreader means and the said valve means and provided with cam follower means, segmental cam means encompassing the toothed portion of the said segmental gear for actuating the said follower means, pump means connected to the said prime mover means, and piping means interconnecting the said cake icing fountain means to the said pump means.

6. A machine of the character described comprising, a base, a motivating shaft mounted rotatably on said base, a cam mounted on said motivating shaft, a driving gear mounted on said motivating shaft, a segmental gear mounted on said motivating shaft, an intermediate shaft mounted on said base, an intermediate pinion mounted on said intermediate shaft in meshing engagement with the said driving gear, a second intermediate pinion mounted on the said intermediate shaft in meshing engagement with the said segmental gear, arresting means slidably engaging the said intermediate shaft and provided with a roller in engagement with the said cam and further provided with arresting extensions, a driven shaft mounted on the said base, a cake supporting table mounted on said driven shaft and provided with peripheral gear teeth in meshing engagement with the said second-mentioned intermediate pinion, a multiplicity of cake supporting units rotatably mounted in the said cake supporting table, each of the said cake supporting units provided with a driven pinion alternately engageable in meshing relationship with the said first-mentioned intermediate pinion, each of the said cake supporting units having their mounting shafts extended so as to be arrested alternately and releasably by the said arresting extensions, cake icing fountain means supported on said base above the said cake supporting table, valve means connected to the said cake icing fountain means, angularly adjustable icing spreader means connected to the said fountain means through the said valve means and arranged to spread icing on the top and peripheral surfaces of a cake supported on one of the said cake supporting units, prime mover means connected to the said motivating shaft, the said spreader means including, a depending elbow secured to the said icing fountain means, and a horizontal spreader articulately secured to the said depending elbow and connected at its free end by extensible piping to the bottom of the said icing fountain means, the said depending elbow and the said horizontal spreader provided with slotted icing feeder and spreader portions substantially throughout their lengths beginning at the point of their articulate connection, automatic valve control and spreader control means connected to the said icing spreader means and the said valve means and provided with cam follower means, segmental cam means encompassing the toothed portion of the said segmental gear for actuating the said follower means, pump means connected to the said prime mover means, and piping means interconnecting the said cake icing fountain means to the said pump means.

GEORGE REGET.

REFERENCES CITED

The following references are of record in the file of this patent:

UNITED STATES PATENTS

| Number | Name | Date |
|---|---|---|
| 681,929 | Rosborough | Sept. 3, 1901 |
| 1,472,022 | Cockbill et al. | Oct. 23, 1923 |
| 1,618,053 | Cates | Feb. 15, 1927 |
| 1,753,549 | Cates | Apr. 8, 1930 |